April 30, 1935.　　　G. P. KLAAS　　　1,999,505
TWIN BY-PASS VALVE
Filed Aug. 12, 1932　　2 Sheets-Sheet 2
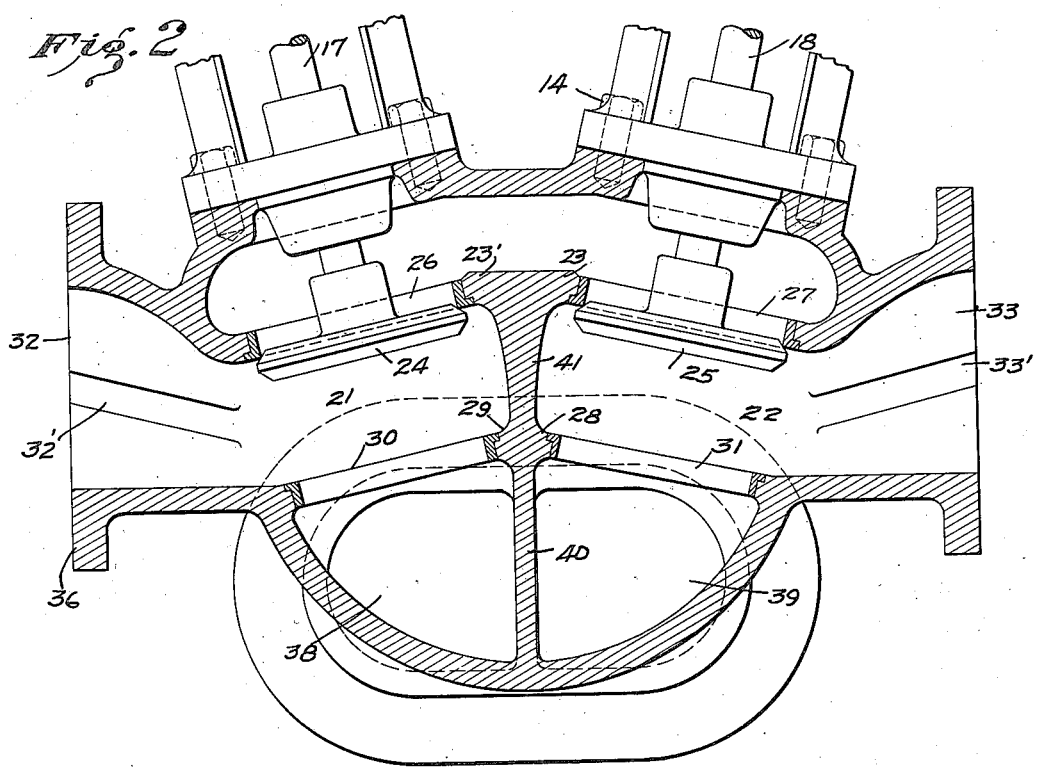
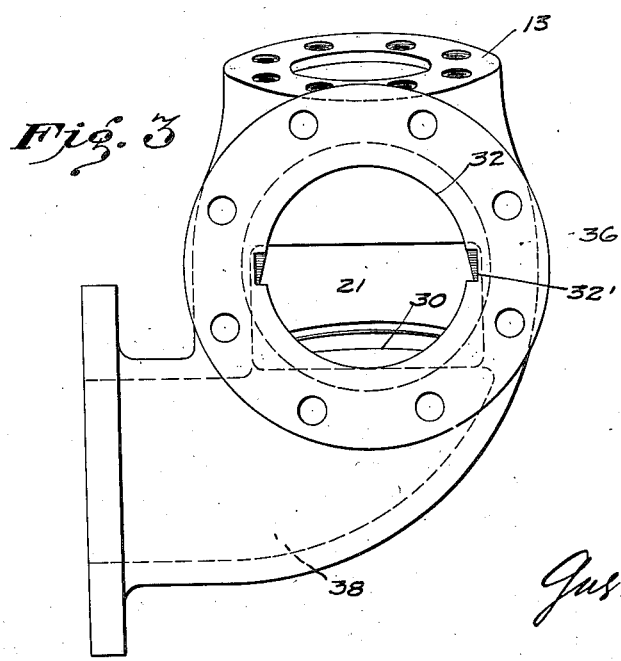
INVENTOR
Gustave P. Klaas Patented Apr. 30, 1935

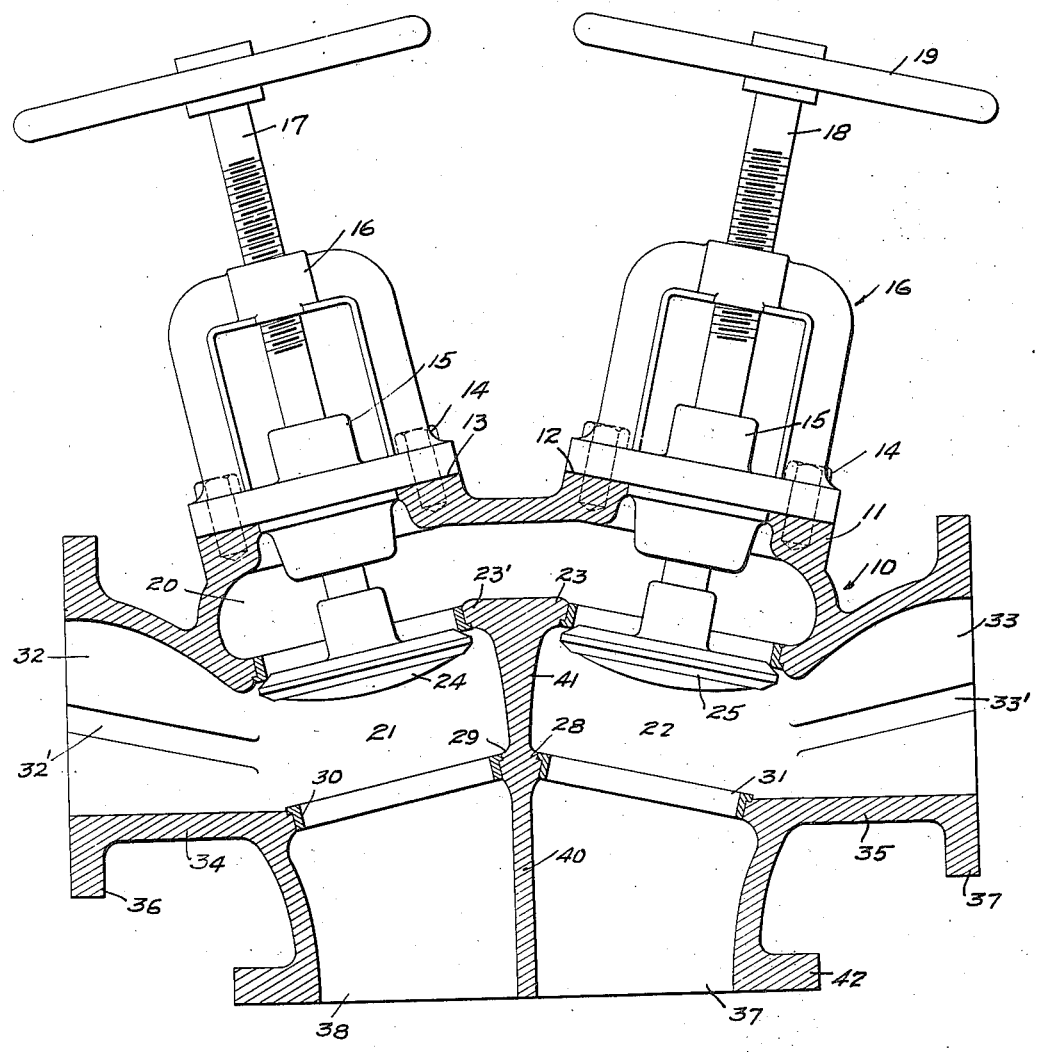

1,999,505

UNITED STATES PATENT OFFICE 1,999,505

TWIN BY-PASS VALVE

Gustave P. Klaas, San Gabriel, Calif., assignor to C. F. Braun & Co., Inc., Alhambra, Calif.

Application August 12, 1932, Serial No. 628,554

2 Claims. (Cl. 277—57)

This invention relates to valve structures and particularly pertains to a twin by-pass valve.

In the assembly of various types of fluid treating apparatus it is necessary to incorporate valves of different structures for the purpose of optionally controlling and directing the paths of flow of a fluid, it often occurs that valves must be mounted in close proximity to each other, as for example in connection with heat-exchangers, condensers, and the like, used in the treatment of petroleum and petroleum products. Due to the limited space afforded and the complications which arise in connection with the pipe fittings, it is desirable to provide valves which may handle a stream of fluid and make it possible to optionally establish a continuous circulation of the stream through a piece of apparatus, to by-pass the stream, or otherwise control its flow.

It is the principal object of the present invention, therefore, to provide a simple valve construction within which a pair of valves is mounted, and which structure is so designed as to be simple to machine and otherwise easy to manufacture, and which will afford a compact unitary multivalve structure having many advantages not possible where two single valves are assembled together.

The present invention contemplates the provision of two separate valve units of the tappet type and which units are mounted within a valve housing in the same plane and will act to direct and control the flow and direction of flow of a fluid along relatively straight paths of flow and through unrestricted passageways so that there will be no objectionable frictional pressure drop in the fluid, and so that all of the advantages of a duplicate structure may be obtained in a relatively light and compact valve unit.

The invention is illustrated by way of example in the accompanying drawings in which Fig. 1 is a view in transverse section through a valve structure, with which the present invention is concerned.

Fig. 2 is a view in transverse section through a similar valve structure with one set of valve parts turned at right angles to the main plane of the valve.

Fig. 3 is a view in side elevation taken on the line 3—3 of Fig. 1, showing the valve structure with the valve bonnet removed.

Referring more particularly to the drawings, 10 generally indicates a valve housing having an upper wall 11 formed with faces 12 and 13, to receive valve stem bonnets 14. These bonnets embody the usual stuffing-box 15 and threaded nut 16 to receive the threaded valve stems 17 and 18. Both of these stems are shown as fitted with operating handwheels 19. The valve stems extend downwardly through a bypass passageway 20, which is separated from intermediate valve chambers 21 and 22 by a partition wall 23. In order to insure that fluid will flow in unrestricted stream lines, the longitudinal axes of the valve stems 17 and 18 are disposed at a slight angle to each other. This will also bring the valve members 24 and 25 close together and will provide sufficient hand room for the relatively large handwheels 19. The partition 23 is formed with openings to receive valve seat bushings 26 and 27 beneath which the valves 24 and 25 are positioned. Partitions 28 and 29 occur within the valve housing in spaced parallel relation to the partitions 23 and 24. These partitions form the opposite side wall of the intermediate valve compartments 21 and 22, and also provide openings to receive the valve seat bushings 30 and 31. These bushings are upon axes concentric with the bushings 26 and 27 and are spaced therefrom so that the valves 24 and 25 may be moved across the compartments 21 and 22 from seated positions against the valve seats 26 and 27 in the opposite partitions thereof. The intermediate valve compartments 21 and 22 communicate with induction passageways 32 and 33 respectively. These passageways are formed by walls 34 and 35, which are here shown as cast integral with the valve body 10, and which walls terminate in parallel bolting flanges 36 and 37. Attention is directed to the fact that the outer ends of the passageways 32 and 33 are disposed with their axes in longitudinal alignment so that the entire valve unit may be directly inserted in a line, or so that various valve units including this one may be bolted end to end in multiple. The other ends of the passageways 32 and 33 are circular in shape and are formed with grooves 32' and 33' in the diametrically opposite sides of the respective passageways. These grooves provide a passageway sufficiently wide to permit the valve seat bushing to be inserted through the passageway and to be mounted in position within the partition walls. This will eliminate the necessity of completely dismantling the valve structure as is now often the case, in order to clean the valve parts, or to replace them. The compartments 21 and 22 and the throats of the passageways 32 and 33 are of sectional area equal to or in excess of that of the outer openings of the passageways, or the opening through the valve seat bushing. The openings through the lower valve seat bushing communicate with passageways 38 and 39. These passageways are substantially parallel and as shown in Fig. 1 of the drawings are in the same plane with passageways 32 and 33, and the valve stems 17 and 18. A partition wall 40 separates the passageways 38 and 39, and this wall continues as indicated at 41, to separate the passageways 21 and 22. A suitable bolting flange 42 is formed at the outer end of the passageways 38 and 39 so that the valve may be attached to apparatus disposed with a bolting face in the same general plane as the bolting faces of flanges 36 and 37. In the form of the invention shown in Fig. 2, however, the passageways 38 and 39 are turned at right angles to the plane of the passageways 32 and 33 so when connections are to be made with apparatus having bolting faces in a plane at right angles to the plane of the bolting flanges 36 and 37, these connections can be performed without use of intermediate pipe joints.

In the operation of the present invention the valves are assembled as shown in the drawings and may be connected in any suitable manner with apparatus to be used. If it is assumed that a flow of fluid enters a valve structure through the passageway 33, it will be evident that if valve member 25 is seated against the valve seat 27, the fluid will flow through the valve seat 31 and passageway 39 into suitable apparatus, such for example as a heat-exchanger, and that the return flow of fluid may pass from the apparatus and along the passageway 38, thereafter flowing through the bushing 30 and out through the passageway 32. If, however, it is desired to bypass the fluid the valves 24 and 25 may be moved to rest upon the valve seat bushings 30 and 31, thus closing off the passageways 38 and 39, and permitting the fluid to flow directly from passageway 33 through the valve seat bushing 27 and then through the bypass passageway 20, through the bushing 26, and outwardly through the passageway 32.

It must be seen that due to this construction a composite valve assembly is not necessary, since the two valves may be readily incorporated in a simple single casting, which will be of lighter weight and may be more easily machined due to its unitary construction, and it will be evident that an unrestricted flow may be had to and from the heat-exchanger through substantially direct passageways within which there will be no appreciable friction pressure loss.

While I have shown the preferred form of my invention as now known to me, it will be understood that various changes may be made in the combination, construction, and arrangement of parts by those skilled in the art without departing from the spirit of the invention as claimed.

Having thus described my invention, what I claim, and desire to secure by Letters Patent is:

1. A twin valve structure comprising a unitary valve housing, a pair of fluid passageways formed on the opposite sides of said housing and being in longitudinal alignment, said housing being formed with bolting flanges circumscribing said passageways, the faces of which flanges are in parallel planes, a central transverse partition separating said passageways, a bypass passageway within said housing and establishing communication with the longitudinally aligned passageways at opposite sides of the central partition through valve openings, parallel passageways on the opposite side of the longitudinally aligned passageways from the bypass passageways within the housing and being collectively circumscribed with a bolting flange in a plane at right angles to the planes of the longitudinally aligned passageways, said parallel passageways being separated by a central partition forming a continuation of the transverse partition between the longitudinally aligned passageways, said parallel passageways communicating with the longitudinally aligned passageways through valve openings, the valve opening of a parallel passageway being disposed in axial alignment with the valve opening of the bypass passageway and spaced from each other upon opposite sides of one of said longitudinally aligned passageways, said valve openings being in parallel planes at a right angle to the longitudinal axis of the longitudinally aligned passageways whereby the central axes of sets of valve openings may extend outwardly at equal angles on the opposite sides of the plane of the central partition of the valve housing, and valve means disposed at said angles and acting alternately between opposed valve sets in each of the longitudinally aligned passageways to alternately close said valve openings.

2. Same as claim 1, and add the following: the space between the opposite walls of the longitudinally aligned passageways at the valve openings being less in width than the width of the longitudinal passageways at their mouths, said passageways being formed with a uniformly grooved space from said larger opening to the area between the valve openings to accommodate the valves as they are inserted into and out of the valve housing.

GUSTAVE P. KLAAS.